US007912495B2

(12) United States Patent
Wu et al.

(10) Patent No.: US 7,912,495 B2
(45) Date of Patent: Mar. 22, 2011

(54) FIXED BIT RATE WIRELESS COMMUNICATIONS APPARATUS AND METHOD

(75) Inventors: Kuo-Hsi Wu, Taipei (TW); Duan-Ruei Shiu, Taipei (TW); Hung-Hsiang Chou, Taipei (TW); Chia-Hui Han, Taipei (TW)

(73) Assignee: ASUSTeK Computer Inc., Peitou, Taipei (TW)

( * ) Notice: Subject to any disclaimer, the term of this patent is extended or adjusted under 35 U.S.C. 154(b) by 596 days.

(21) Appl. No.: 11/593,116

(22) Filed: Nov. 6, 2006

(65) Prior Publication Data
US 2008/0107129 A1 May 8, 2008

(51) Int. Cl.
*H04M 1/00* (2006.01)
(52) U.S. Cl. ............... 455/550.1; 455/553.1; 455/556.2; 370/338
(58) Field of Classification Search .......... 455/410–411, 455/550.1, 552.1; 370/310, 328, 338
See application file for complete search history.

(56) References Cited

U.S. PATENT DOCUMENTS

| 6,393,032 | B1* | 5/2002 | Ikegami | 370/447 |
|---|---|---|---|---|
| 2003/0206542 | A1* | 11/2003 | Holder | 370/338 |
| 2003/0228842 | A1* | 12/2003 | Heinonen et al. | 455/41.2 |
| 2004/0160979 | A1* | 8/2004 | Pepin et al. | 370/462 |
| 2004/0208151 | A1* | 10/2004 | Haverinen et al. | 370/338 |
| 2004/0259544 | A1* | 12/2004 | Amos | 455/435.1 |
| 2005/0063381 | A1* | 3/2005 | Kayalackakom et al. | 370/389 |
| 2005/0265323 | A1* | 12/2005 | Thermond | 370/356 |
| 2006/0184975 | A1* | 8/2006 | Casey | 725/81 |
| 2007/0081462 | A1* | 4/2007 | Gefflaut et al. | 370/235 |
| 2007/0136587 | A1* | 6/2007 | Shvodian et al. | 713/169 |
| 2007/0238483 | A1* | 10/2007 | Boireau et al. | 455/553.1 |

OTHER PUBLICATIONS

Jun Qian, Digital Family Technology Column (10), Introduction for WiMAX technology,Electronic and Computer, 2004, p. 103-107, vol. 12, Electronic Industry Press, Beijing.

* cited by examiner

*Primary Examiner* — Kamran Afshar
(74) *Attorney, Agent, or Firm* — Winston Hsu; Scott Margo

(57) ABSTRACT

A wireless communication system transmits and receives electronic voice signals between a wireless communication device and a wireless networking device at a call bitrate stored in the wireless communication device. By using the call bitrate when transmitting and receiving call signals, the wireless communication system is able to eliminate delays in the call signals caused if the signal becomes worse.

11 Claims, 3 Drawing Sheets

FIXED BIT RATE WIRELESS COMMUNICATIONS APPARATUS AND METHOD

BACKGROUND OF THE INVENTION

1. Field of the Invention

The present invention relates to wireless communications devices, and more particularly, to a wireless communications system that transfers signals at a predetermined call bitrate which is not determined through a maximizing process and a related method of use.

2. Description of the Prior Art

Distance interpersonal communication started with written correspondence over physical media, and has now migrated in modern times to verbal and written correspondence over electronic media. The telephone allows two or more people to communicate verbally over phone lines connected throughout the world by the Public Switched Telephone Network (PSTN). Cellular phones enable wireless verbal communication through wireless connections with base towers that are connected to the PSTN.

Typical, subjective metrics of call quality include volume levels, delay, echo, noise, and speech quality. A good call signal would be characterized by having steady and sufficient volume, no delay, no echoes, no noise, and high speech quality. However, most call system solutions face limitations that require tradeoffs among the quality metrics. A system with exceptional speech quality may suffer in delay. Another system with good noise performance may have echoes.

Conventional phones and cellular phones connected to the PSTN provide stable service, with reasonable quality. However, introduction of new technologies such as Voice over IP (VoIP) enables extra dimensions of communication to speech, including integration with a personal computer (PC), global connectivity, and real-time status of call recipients. By integrating telephone services with a PC, a caller can use a contact list from email software, such as Microsoft Outlook, to store phone numbers. Calls can be logged and recorded directly to a local hard drive in the PC. In terms of connectivity, VoIP enables the caller to make and receive calls from anywhere with network access. Finally, VoIP enables real-time recipient status, which is typically associated with chat programs, such as MSN Messenger or AIM. Using a VoIP device, a caller can tell if a recipient is available, away, busy, or offline. VoIP allows for communication strictly over a network, or through the PSTN. The former is free, whereas the latter usually carries an additional charge.

In such a usage scenario, VoIP devices typically connect to the global Internet or an internal network through a computer running a VoIP software, such as Skype. The VoIP device could be, for example, a microphone and speakers, a headset, or a USB handset, the third of which appears most like a conventional phone. All of these solutions are wired, i.e. each solution connects to the computer, and thereby to the global Internet or the internal network, through a wire or cable.

Of course, by taking advantage of wireless networking technology, such as 802.11a/b/g standard transceivers, a Wireless Local Area Network (WLAN) VoIP device can be realized as a wireless handset identifiable to a networking device, such as a router, by a unique MAC address. In this way, the WLAN VoIP device can exhibit advantages of cordless phones and cellular phones. A further advantage of the WLAN VoIP device over cellular phones is an ability to reduce costs through free calling over the global Internet and low per-minute rates on calls over the PSTN.

One disadvantage of the WLAN VoIP device, however, arises due to an automatic bitrate control, or Adaptive Rate Selection, function of the WLAN. Please refer to FIG. 1, which shows a diagram of wireless signal bitrate throughout a room with various obstructions 10. One factor that affects supportable bitrate is signal attenuation. As a distance between the WLAN VoIP device and the networking device increases, a power of the signal decreases. Obstructions between the WLAN VoIP device and the networking device also decrease a power of the signal. Further, reflections of the signal from walls, floors, and obstructions 10 cause signal interference. As attenuation and interference increase, the bitrate must be reduced to ensure good transmission between the WLAN VoIP device and the networking device. If the WLAN VoIP device is stationary, the bitrate may be affected by people walking in front of the signal. Of course, if the WLAN VoIP device is not stationary, but moving, the supportable bitrate throughout the room causes the Adaptive Rate Selection function to activate. In normal implementation, WLAN VoIP devices or networking devices always start at a highest bitrate to send packets. Whenever the signal quality becomes worse, this causes perceptible degradation in the call signal quality. Particularly, delays can occur in the call signal due to taking several trials to reduce the bitrate to a sustainable one.

To further complicate the issue, the 802.11a/b/g transceiver uses different modulation schemes at different bitrates. For example, in an 802.11g transceiver, an OFDM (orthogonal frequency-division multiplexing) modulation scheme is used at bitrates of 6, 9, 12, 18, 24, 36, 48, and 54 Mbps. However, at 5.5 and 11 Mbps, a CCK (complementary code keying) modulation scheme is employed. Finally, at 1 and 2 Mbps bitrates, a DBPSK/DQPSK (differential binary/quadrature phase shift keying) modulation scheme is used. Thus, as the WLAN VoIP device adjusts for different supportable bitrates, not only are bitrates adjusted, but modulation schemes change, which further degrades the call signal.

SUMMARY OF THE INVENTION

According to the present invention, a wireless communications device comprises a microphone for inputting sounds, a speaker for projecting sounds, a wireless transceiver for receiving and transmitting radio frequency signals, and means for establishing a wireless connection at a predetermined call bitrate which is not determined through a maximizing process between the wireless transceiver and a wireless networking device.

According to the present invention, a wireless communications system comprises a wireless networking device, and a wireless communications device. The wireless communications device comprises a microphone for inputting sounds, a speaker for projecting sounds, a wireless transceiver for receiving and transmitting radio frequency signals, and means for establishing a wireless connection at a predetermined call bitrate which is not determined through a maximizing process between the wireless transceiver and the wireless networking device.

Finally, according to the present invention, a method of performing voice communication in a wireless network comprises establishing a wireless connection at a predetermined call bitrate which is not determined through a maximizing process between a wireless transceiver of a wireless communications device and a wireless networking device, and using the predetermined call bitrate when a call signal is transmitted between the wireless communications device and the wireless networking device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
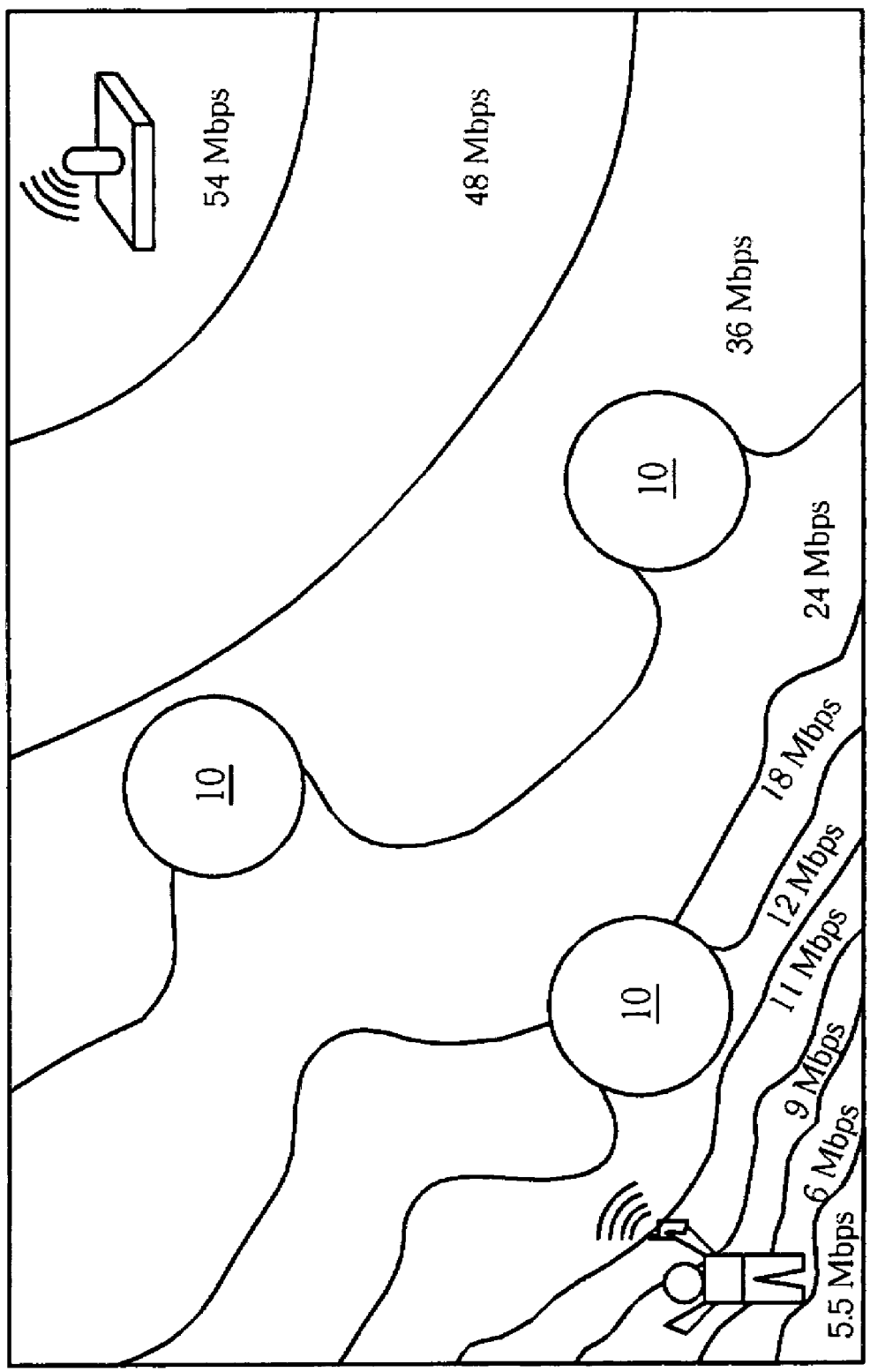
FIG. 1 is a diagram of wireless signal bitrate throughout a room with various obstructions according to the prior art.
Figure 2:
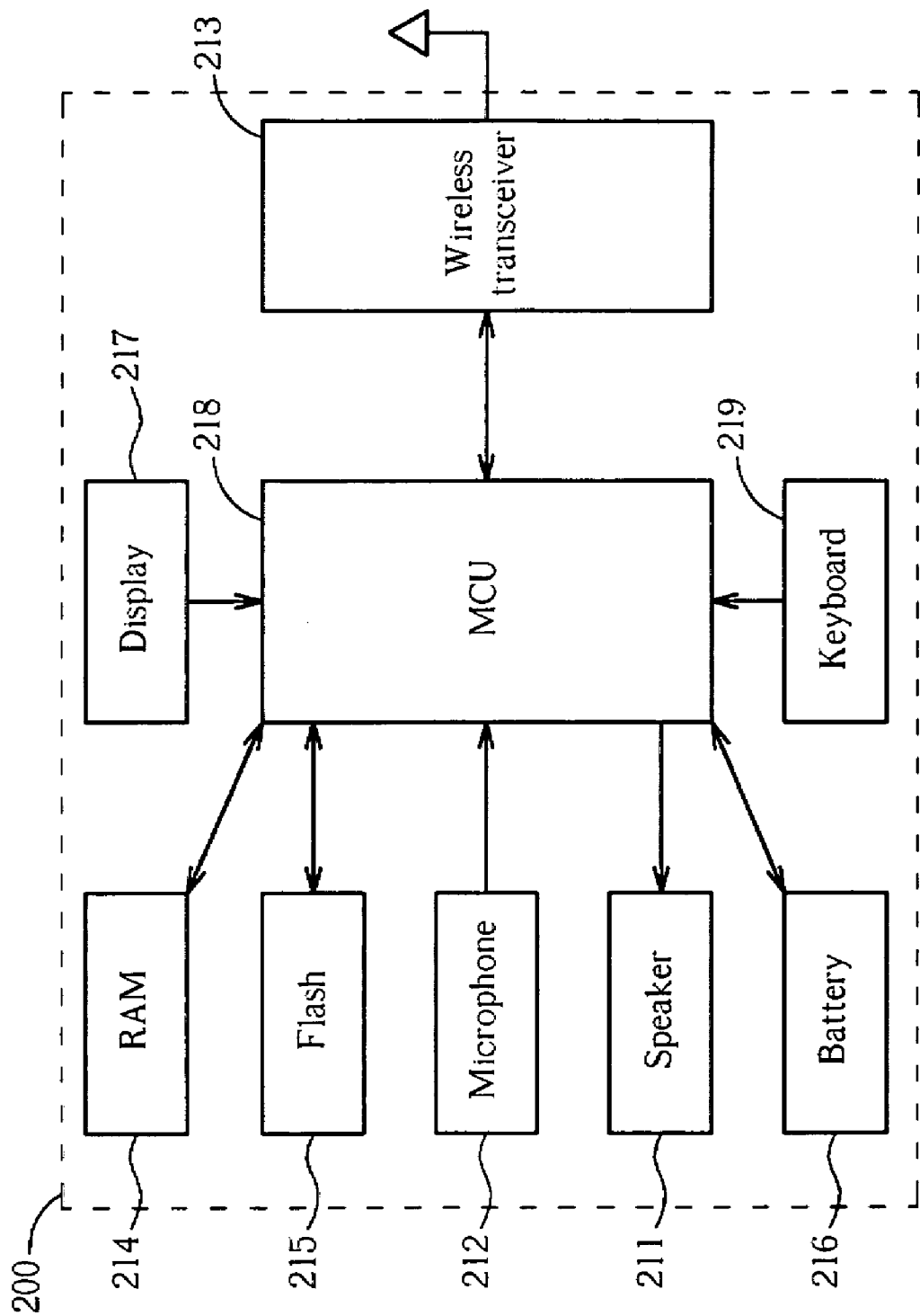
FIG. 2 is a diagram of a wireless communications system according to the present invention.

Please refer to FIG. 2, which is a diagram of a wireless communications system 200 according to the present invention. The wireless communications system 200 comprises a speaker 211 for outputting sounds, a microphone 212 for inputting sounds, and a wireless transceiver 213 for transmitting and receiving radio frequency signals corresponding to the sounds inputted at the microphone and the sounds outputted by the speaker, respectively. The wireless communications system 200 further comprises a microcontroller (MCU) 218, a RAM 214, a flash memory 215, a battery 216, a display 217, and a keyboard 219. The radio frequency signals are transmitted and received between the wireless transceiver of the wireless communications system 200 and a wireless transceiver (not shown) of a wireless networking device (not shown). The radio frequency signals are transmitted by the wireless transceiver 213 of the wireless communications system 200 and by the wireless transceiver of the wireless networking device at a predetermined call bitrate which is not determined through a maximization process. A preferred call bitrate for the radio frequency signals is 6 Mbps, which should be sufficient to transfer VoIP packets on time. However, another call bitrate could be chosen to eliminate occurrence of delays in the radio frequency signals due to bitrate changes. The wireless communications system 200 further comprises means for establishing the wireless connection at the predetermined call bitrate which is not determined through the maximizing process between the wireless transceiver and the wireless networking device.

It should be noted that the wireless networking device described above is not limited to wireless routers, but includes notebook computers with integrated or external wireless transceivers, desktop computers with integrated or external wireless transceivers, or any other VoIP-enabled device with a wireless transceiver. Though the present invention wireless transceiver is preferably an IEEE 802.11 standard transceiver, it should be obvious to one familiar with the art that the present invention wireless transceiver could be any transceiver used to send electronic signals through a wireless medium. Further, the wireless transceiver, as alluded to above, could be packaged in numerous ways, such as in a USB dongle, an integrated circuit on a motherboard, or a PCI extension card connected to the motherboard.

Figure 3:
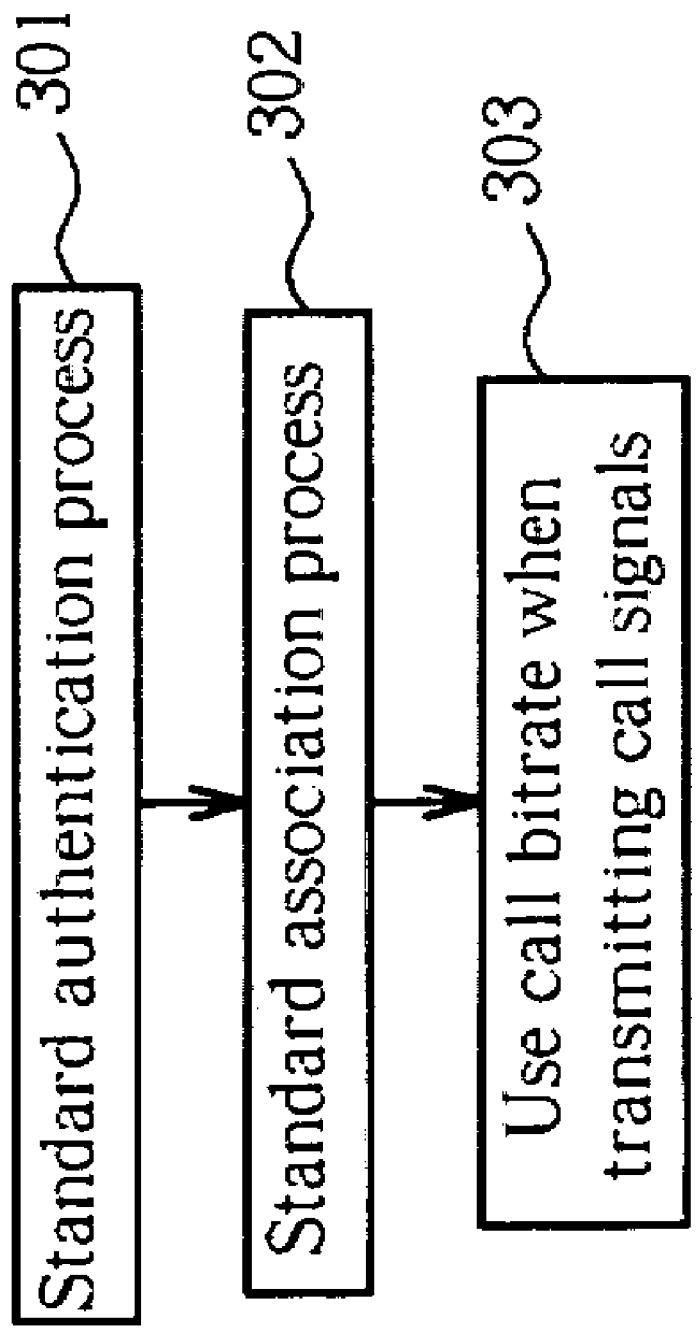
FIG. 3 is a flow chart of a method of performing wireless communication in a wireless network according to the present invention.

The present invention also teaches a method of performing voice communication in the wireless communications system 200 described above. Please refer to FIG. 3, which is a flow chart of the method of performing voice communication in a wireless network. For purposes of explanation, the wireless network can be the wireless communications system 200 described above. The method of performing voice communication in the wireless network comprises the following steps:

Step 301: Complete a standard authentication process between the wireless communications device and the wireless networking device;

Step 302: Complete a standard association process between the wireless communications device and the wireless networking device;

Step 303: Use the predetermined call bitrate when a call signal is transmitted between the wireless communications device and the wireless networking device.

By using the predetermined call bitrate which is not determined through a maximizing process whenever the call signal is sent, the present invention method eliminates delays caused by changing the bitrate of the call signal every time a supportable bitrate increases or decreases.

Thus, it can be seen that the present invention method eliminates one major problem facing migration to wireless VoIP phones, which problem is delays in the call signal caused if the signal becomes worse in the prior art. By using a fixed bitrate, i.e. the predetermined call bitrate which is not determined through a maximizing process, to transmit all call signals between the wireless communication device and the wireless networking device, delays are eliminated, while maintaining good call signal quality.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communications device comprising:
   a microphone for inputting sounds;
   a speaker for projecting sounds;
   a wireless transceiver for receiving and transmitting all call signals over a wireless connection at a fixed call bitrate anytime, so as to eliminate delays caused by changing call bitrate; and
   means for establishing the wireless connection at the fixed call bitrate which is not determined through a maximizing process between the wireless transceiver and a wireless networking device.

2. A wireless communications system comprising:
   a wireless networking device; and
   a wireless communications device comprising:
      a microphone for inputting sounds;
      a speaker for projecting sounds;
      a wireless transceiver for receiving and transmitting all call signals over a wireless connection with the wireless networking device at a fixed call bitrate anytime, so as to eliminate delays caused by changing call bitrate; and
      means for establishing the wireless connection at the fixed call bitrate which is not determined through a maximizing process between the wireless transceiver and the wireless networking device.

3. The wireless communications system of claim 2, wherein the wireless networking device is a router.

4. The wireless communications system of claim 2, wherein the wireless networking device is a dongle.

5. The wireless communications system of claim 4, wherein the dongle is a USB dongle.

6. The wireless communications system of claim 2, wherein the wireless networking device is a computer system comprising a wireless transceiver.

7. The wireless communications system of claim 6, wherein the computer is a notebook computer.

8. A method of performing voice communication in a wireless network comprising:
 establishing a wireless connection at a fixed call bitrate which is not determined through a maximizing process between a wireless transceiver of a wireless communications device and a wireless networking device; and
 using the fixed call bitrate to transmit all call signals over the wireless connection between the wireless communications device and the wireless networking device anytime, so as to eliminate delays caused by changing call bitrate.

9. The method of claim 8, wherein establishing the wireless connection at the fixed call bitrate which is not determined through the maximizing process between the wireless transceiver of the wireless communications device and the wireless networking device comprises:
 completing a standard authentication process between the wireless communications device and the wireless networking device; and
 completing a standard association process between the wireless communications device and the wireless networking device.

10. The method of claim 8, wherein establishing the wireless connection at the fixed call bitrate which is not determined through the maximizing process between the wireless transceiver of the wireless communications device and the wireless networking device comprises establishing an ad-hoc wireless connection.

11. The method of claim 8, wherein establishing the wireless connection at the fixed call bitrate which is not determined through the maximizing process between the wireless transceiver of the wireless communications device and the wireless networking device comprises establishing an infrastructure wireless connection.

\* \* \* \* \*